United States Patent [19]

Gage

[11] 4,326,558
[45] Apr. 27, 1982

[54] STEERING SYSTEM INCLUDING ACCUMULATOR FOR SUPPLYING EMERGENCY RESERVE OF FLUID

[75] Inventor: Douglas M. Gage, Dubuque, Iowa
[73] Assignee: Deere & Company, Moline, Ill.
[21] Appl. No.: 209,763
[22] Filed: Nov. 24, 1980
[51] Int. Cl.³ .............................................. B62D 5/08
[52] U.S. Cl. ...................................... 137/554; 60/328;
60/404; 91/28; 137/113; 180/133; 251/54;
251/63.4; 251/297
[58] Field of Search .......................... 60/328, 404, 405;
91/28; 180/133; 137/110, 113, 114, 554;
251/36, 47, 54, 63.4, 297

[56] References Cited

U.S. PATENT DOCUMENTS

| | | | |
|---|---|---|---|
| 3,174,500 | 3/1965 | Johnson | 251/297 X |
| 3,227,172 | 1/1966 | Sims | 251/54 X |
| 3,448,756 | 6/1969 | Nordegren | 251/47 X |
| 4,160,490 | 7/1979 | Bexten | 60/405 X |
| 4,242,867 | 1/1981 | Belart | 60/404 X |

Primary Examiner—Robert G. Nilson

[57] ABSTRACT

A hydraulic fluid power system includes an accumulator which stores a reserve of pressure fluid at pump standby pressure. The charging and discharging of the accumulator is controlled by an emergency steering valve which is operable in response to a predetermined minimum fluid pressure outputted by the steering pump to discharge the stored fluid for emergency steering. The emergency steering valve also has components which serve as a pressure switch which is actuated to complete a circuit through an indicator light whenever the emergency steering valve moves to effect the discharge of the accumulator. The steering valve components are arranged so that premature actuation of the indicator light during pressure drops of short duration are avoided.

5 Claims, 1 Drawing Figure

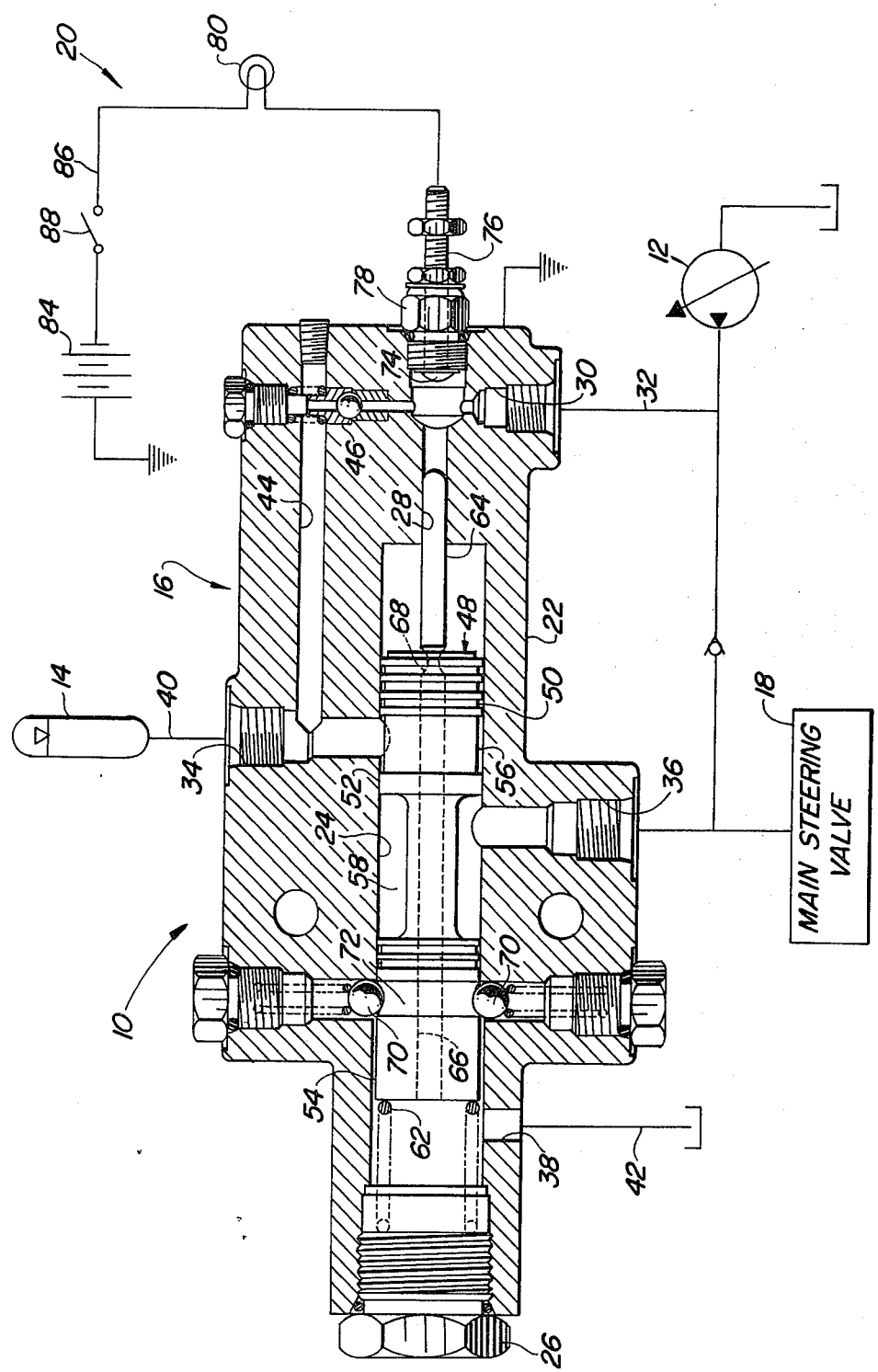

STEERING SYSTEM INCLUDING ACCUMULATOR FOR SUPPLYING EMERGENCY RESERVE OF FLUID

BACKGROUND OF THE INVENTION

The present invention relates to hydraulic fluid power steering systems having an accumulator for supplying fluid in the event that the vehicle engine or primary fluid pressure source fails and more particularly relates to improvements in the system disclosed in copending application, Ser. No. 196,199, filed on Oct. 14, 1980 by Gage et al and assigned to the same assignee as is the instant application.

A power steering system disclosed in the above-identified patent application includes an emergency steering valve coupled to an accumulator, to a steering fluid pressure supply pump and to a main steering control valve and comprises a pressure-responsive valve spool which occupies a normal or closed position wherein it prevents the discharge of fluid from the accumulator when the system pressure is above a predetermined minimum value and automatically shifts to an emergency or open position wherein it permits fluid to discharge from the accumulator to the main steering valve when the system pressure decreases to the predetermined minimum value. When the valve spool shifts to its emergency position, it completes an electrical circuit to an indicator which apprises the operator that the steering system is operating in an emergency steering mode. One drawback of this electrical circuit is that it requires a resistor which acts as a source of constant power drainage. Another drawback is that the valve spool may oscillate in response to pressure surges and effect a premature activation of the emergency steering mode indicator.

SUMMARY OF THE INVENTION

According to the present invention, there is provided an improved emergency steering valve arrangement for completing an electrical circuit to an indicator which apprises an operator that the vehicle steering system is operating in an emergency steering mode. Specifically, the emergency steering valve includes a pressure-responsive valve spool which occupies a normal or closed position wherein it blocks communication between an emergency fluid supply contained within an accumulator and a main steering valve when a steering fluid supply pump is supplying a normal amount of fluid, the valve spool shifting to an emergency or open position wherein it permits fluid to discharge from the accumulator to the main steering valve when the output from the steering fluid pump drops below a normal value. The valve spool serves as one contact of a switch having another contact which the valve spool engages to complete a circuit to the emergency steering mode indicator when the valve spool reaches its open position.

It is an object of the invention to provide an electrically controlled emergency steering mode indicator which is efficiently and reliably energized only when an emergency steering mode condition exists.

It is a more specific object of the invention to provide an indicator embodied in an electrical circuit having an emergency steering valve spool as one contact of a switch of the circuit which is closed only upon the steering valve reaching an open position wherein it routes a reserve of emergency steering fluid to the main steering valve.

Yet another specific object of the invention is to provide an emergency steering valve spool as set forth above wherein it is detented in its closed position and is regulated to move toward its open position at a predetermined rate.

These and other objects will become apparent from a reading of the ensuing description, together with the appended drawing.

BRIEF DESCRIPTION OF THE DRAWING

The sole FIGURE shows a portion of a power steering system, including a longitudinal sectional view of the emergency steering valve and a schematic representation of the electrical steering mode indicator circuit.

DESCRIPTION OF THE PREFERRED EMBODIMENT

Referring now to the drawing, therein is shown a pertinent portion of a power steering system indicated in its entirety by the reference numeral 10. The steering system 10 includes a pump 12 driven by a vehicle engine and connected to an accumulator 14 through the medium of an emergency steering valve 16. The pump 12 and valve 16 are connected to a main steering valve indicated by the functional box 18.

As will be described in more detail below, the emergency steering valve 16 embodies structure which serves as a pressure switch forming part of a steering condition indicator circuit 20.

The emergency steering valve 16 includes a valve body 22 defining a valve bore 24 having its left-hand end closed by a threaded plug 26. A passage 28 is axially aligned with the bore 24 and is intersected by an inlet port 30, which is connected to the outlet of the pump 12 by a conduit 32. Intersecting the bore 24 at respective locations spaced leftwardly in serial order from the right-hand end of the bore are a charge-discharge port 34, a steering pressure fluid outlet port 36 and a sump port 38. The port 34 is connected to the accumulator 14 by a conduit 40 while a branch of the conduit 18 is connected to the port 36 and a conduit 42 connects the port 38 to sump.

Fluid is routed from the inlet port 30 to the accumulator 14 by way of the charge-discharge port 34 through an accumulator charge passage 44 having, as viewed in the drawing, a vertical section intersecting the passage 28 and a horizontal section intersecting the port 34. Mounted in the vertical section of the passage 44 is a one-way valve 46 arranged for permitting fluid to flow from the inlet port 30 to the accumulator 14 but not in the opposite or reverse direction.

Axially, shiftably mounted in the bore 24 for controlling the flow of fluid between the ports 34 and 36 is a valve spool 48. Specifically, the spool 48 has a land 50 at its right-hand end and intermediate land 52 spaced leftwardly from the land 50 and a land 54 spwaced leftwardly from the land 52. A relatively shallow recess 56 exists between the lands 50 and 52 while a much deeper recess 58 exists between the lands 52 and 54. A coil compression spring 62 is compressed between the plug 26 and the left-hand end of the land 54 and acts in opposition to any force as might be exerted on the right-hand end of the spool by a pin 64 reciprocably mounted in the passage 28 and having its right-hand end exposed to system pressure at the inlet port 30. To insure free movement of the spool 48, a passage 66 extends axially through the spool and is in constant fluid communication with the sump port 38. For a purpose to be explained in more detail below, the right-hand end of the passage 66 forms an orifice 68 which regulates the speed at which the valve spool 48 will shift within the bore 24.

When the valve spool 48 is in its normal operating position, as illustrated, the land 52 is located between the charge-discharge port 34 and the outlet port 36 and thus prevents discharge of the accumulator 14. The valve spool 48 is maintained in this position so as not to be affected by pressure surges by means of a plurality of spring-loaded detent balls 70 which are engaged in an annular detent groove 72 formed in the land 54. However, upon the pressure at the inlet port 30 falling to a predetermined minimum value, which is less than the lowest pressure expected during normal system pressure fluctuations, the spring 62 will overcome the force exerted by the pin 64 and the detent balls 70 and will shift the spool 48 rightwardly to its emergency or open position wherein the intermediate land 52 is disposed rightwardly of the charge-discharge port 34 to thus connect the accumulator 14 for discharging its reserve of fluid pressure through the outlet port 36 for use in emergency steering operation.

When the valve spool 48 is in its open or emergency position, the right-hand end of the spool is in engagement with the pin 64 and holds the latter in engagement with a head 74 of an insulated screw 76 received in a plug 78 closing the right-hand end of the passage 28. The pin 64 and the head 74 of the screw 74 form opposite contacts of a normally open switch of the steering condition indicator circuit 20. An operator of the vehicle embodying the steering system is made aware or apprised of the fact that the pressure in the system has fallen below that for normal operation and that the system is operating in an emergency steering mode with the accumulator 14 supplying the steering fluid by acuation of an indicator, here shown in the form of a light 80, connected in the circuit 20. Specifically, the light 80 is connected in series with the normally open pressure switch formed by the screw 76 and the pin 64. A source of electrical current, here shown in the form of a battery 84, is connected to a power lead 86 in which is located an on-off switch 88 that is preferably embodied in the vehicle ignition switch such as to be closed any time the vehicle engine is running. Thus, it will be appreciated that under normal operating conditions, with the pin 64 shifted leftwardly out of engagement with the head 74 of the screw 76, an open circuit will exist and no current will be flowing through the indicator light 80. However, upon there being a loss of pressure sufficient that the spring 62 disengages the spool 48 from the detent balls 70, the valve spool 48 will move rightwardly and engage the pin 64 with the head 74 to complete the circuit and activate the indicator light 80. The size of the orifice 68 governs the speed at which the spool 48 will travel rightwardly after it is released from the detent balls and thus, a predetermined delay exists between the time when the spool 48 becomes released from the balls 70 and when the pin 64 becomes engaged with the screw head 74, this delay being chosen to prevent premature energization of the indicator light 80, as might occur during pressure surges in the hydraulic system.

The operation of the steering system is thought to be understood from the foregoing and for the sake of brevity, no further description is given.

I claim:

1. In an emergency steering valve including a valve bore intersected by first and second ports respectively adapted for connection to an accumulator and to a main power steering valve, a pressure-responsive valve spool reciprocably mounted in the bore for movement between a closed position wherein it blocks fluid communication between the first and second ports and an open position wherein it establishes fluid communication between the first and second ports, pilot pressure means adapted for connection to a primary source of fluid pressure and arranged for shifting the valve spool to its closed position when the fluid pressure emanating from the primary source is adequate for normal steering operation, a biasing means arranged for shifting the valve spool to its open position when the primary source of fluid pressure fails and an electrical steering condition indicator circuit including an energizable indicator element and a pressure switch means operable for completing a circuit through the indicator element only when the valve spool is shifted away from its closed position, the improvement comprising: said pressure switch means including means operated by the valve spool for completing the circuit through the indicator element only when the valve spool reaches its open position and delay means for regulating the speed of travel of the valve spool from its closed to its open position for preventing premature actuation of the indicator element in response to primary fluid pressure decreases of short duration.

2. The emergency steering valve defined in claim 1 wherein the delay means comprises a restricted passage interconnecting fluid chambers at the opposite ends of the valve spool.

3. The emergency steering valve defined in claim 2 wherein the restricted passage extends axially through the valve spool.

4. The emergency steering valve defined in claim 1 wherein the pilot pressure means comprises a passage extending axially into the valve bore, a pin reciprocably mounted in the passage and an inlet port communicating with an end of the pin and adapted for connection to the primary source and said pressure switch means including said pin and a contact arranged for engagement by the pin when the valve spool is in its open position.

5. The emergency steering valve defined in claim 1 and further including detent means for releasably holding the spool in its closed position.

* * * * *